UNITED STATES PATENT OFFICE 1,924,434

WATER-INSOLUBLE AZO-DYESTUFFS

Erwin Hoffa and Paul Jörg, Frankfort-on-the-Main-Hochst, Germany, assignors to General Aniline Works, Inc., New York, N. Y., a corporation of Delaware No Drawing. Application January 30, 1930, Serial No. 424,732, and in Germany February 18, 1929

10 Claims. (Cl. 260—84)

The present invention relates to water-insoluble azo-dyestuffs, more particularly it relates to new azo dyestuffs of the following probable formula:

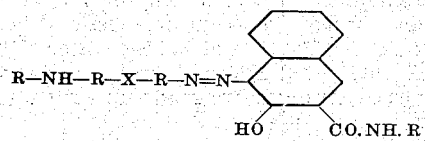

wherein the R's stand for residues of the benzene or naphthalene series, and X means a direct linkage existing between the two residues R or it represents the group —N=N.

We have found that polynuclear or condensed aromatic systems, which contain in one of the nuclei a free amino-group and in another nucleus an arylamino-group, represent diazo-components which yield valuable dyestuffs when coupled with 2.3-hydroxynaphthoic acid arylamines. Those of the said bases, whose nonarylated parent products—that is such as contain two free amino groups—are capable of forming substantive azo-dyestuffs, have the remarkable property of yielding azo-dyestuffs of particularly deep shades.

Bases of the said kind are generally capable of yielding by the action of 2 molecular proportions of sodium nitrite in acid media nitrosodiazo-compounds which give red to reddish-brown dyeings when coupled with 2.3-hydroxynaphthoic acid arylamines; these dyeings which are probably produced by the formation of nitroso-azo-dyestuffs, are transformed when after-treated with a suitable reducing agent or, in some cases, with a saponifying agent, into dyeings of the simple azo-dyestuffs, that is of the dyestuffs which do not contain the nitroso-group.

The bases can be substituted in the aryl nuclei in any desired manner, but they must not contain any group rendering the dyestuffs soluble in water, as, for instance, sulfo-groups or carboxylic acids groups. The dyestuffs can be produced on the fiber as well as in substance or in the presence of any of the usual substrata which are adapted for the production of lakes.

The following examples serve to illustrate the invention, but they are not intended to limit it thereto:

(1) 50 grams of cotton are impregnated with a grounding liquor prepared as follows:

4.5 grams of 2-3-hydroxynaphthoic acid-5'-chloro-1'-methyl-2-anilide, 9 grams of Turkey red oil, and 4.5 grams of caustic soda solution of 34° Bé are dissolved in 100 ccm of boiling water; to the solution are added 4.5 ccm of formaldehyde of 40 per cent. strength, and the whole is made up with water to 1000 ccm; after the cotton thus impregnated has been squeezed, the dyeing is produced in a dyebath prepared as follows:

2.7 grams of 4-amino-4'-phenylaminodiphenyl and 3 ccm of hydrochloric acid of 22° Bé are boiled together with 100 ccm of water, cooled on ice to 10° C. and diazotized with 15 ccm of sodium nitrite solution 1:10. To this diazosolution are added 10 grams of crystallized sodium acetate, 1 gram of sodium carbonate, 10 grams of sodium chloride and the whole is made up with water to 1000 ccm.

The dyed cotton yarn has a claret red tint; it is rinsed and treated for half-an-hour in a boiling bath containing a solution of 3 grams of soap, 2.5 grams of sodium carbonate, 2 grams of phenyl hydrazine-meta-sulfonic acid in 1000 ccm of water, rinsed again and dried. The dyed material which is at first claret-red assumes, when after-treated, a deep, very reddish dark blue tint of very good fastness to washing and good fastness to chlorine and to kier boiling. The new dyestuff is a dark powder and has the following probable formula:

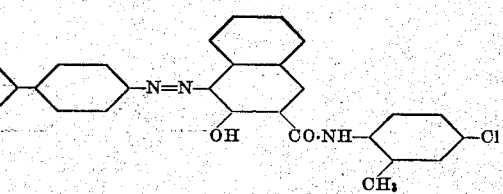

(2) By substituting 4.5 grams of 2.3-hydroxy-napthoic acid-4'-chloro-1'-anilide for the 4.5-grams of 2.3 hydroxynapthoic acid-5'-chloro-1'-methyl-2'-anilide used in Example 1, a dyestuff of similar properties is obtained. The new dyestuff is a dark powder and has the following probable formula:

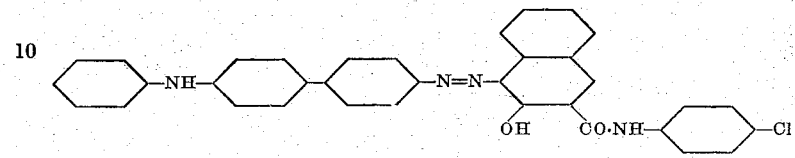

The following dyeing process is applied in Examples 3–7:

50 grams of boiled cotton yarn are treated with the grounding liquor for half-an-hour, then squeezed and dyed for half-an-hour in the dyebath. The material is then rinsed, soaped for half-an-hour in a boiling bath containing 3 grams of soap, 1 gram of sodium carbonate and 5 grams of sodium sulfite in 1000 ccm of water, rinsed and dried.

Instead of sodium sulfite there may be used 2 grams of sodium sulfide or 5 grams of sodium phenyl hydrazine-meta-sulfonate, or 1 gram of concentrated sodium hydrosulfite.

(3) A. grounding liquor 4.5 grams of 2.3-hydroxynaphthoic acid-5'-

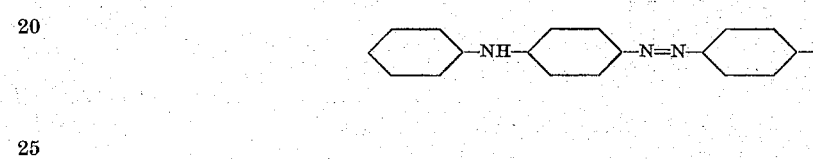

chloro-1'-methyl-2'-anilide, 9 ccm of Turkey red oil of 50 per cent strength, 9 ccm of caustic soda solution of 34° Bé, 200 ccm of boiling water, 200 ccm of cold water, 2.25 ccm of formaldehyde of 30 per cent. strength, the whole being made up with water to 1000 ccm.

B. Dyebath 2.9 grams of phenylamino-benzene-azo-aniline of the formula

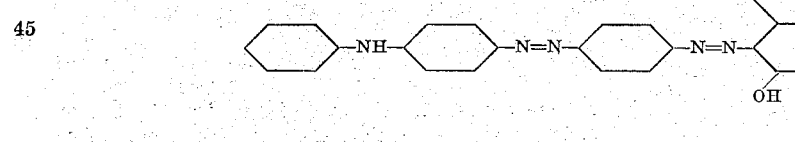

are treated with 3.8 ccm of hydrochloric acid of 22° Bé and 15 ccm of sodium nitrite (solution 1:10) whereby a nitroso-diazo-compound is obtained. After half-an-hour the solution is neutralized with 10 grams of sodium acetate (solution 1:5) 25 grams of dissolved common salt are added and the whole is made up to 1 liter.

There is obtained a garnet dyeing which turns intense black when after-treated. The new dyestuff is a dark powder and has the probable formula:

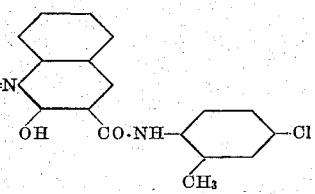

(4) A. Grounding liquor 2.5 grams of 2.3-hydroxynaphthoic acid 2-naphthylamide, 10 ccm of Turkey red oil of 50 per cent strength, 7.5 ccm of caustic soda solution of 34° Bé, 200 ccm of boiling water, 200 ccm of cold water, and 1.25 ccm of formaldehyde of 30 per cent. strength are made up with water to 1 liter.

B. Dyebath—The same as in Example 3

There is obtained a garnet dyeing which turns intense black when after-treated. The new dyestuff is a dark powder and has the following probable formula:

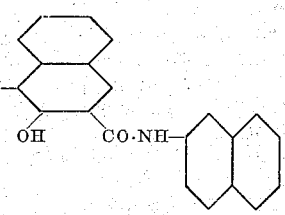

(5) A. Grounding liquor 7.5 grams of 2.3-hydroxynaphthoic acid anilide, 15 ccm of Turkey red oil of 50 per cent. strength, 11.5 ccm of caustic soda solution of 34° Bé, 200 ccm of boiling water, 200 ccm of cold water, 3.75 ccm of formaldehyde of 30 per cent. strength are made up with water to 1 liter.

B. Dyebath—The same as in Example 3

There is obtained a garnet dyeing which turns an intense deep black when after-treated. The new dyestuff is a dark powder and has the following probable formula:

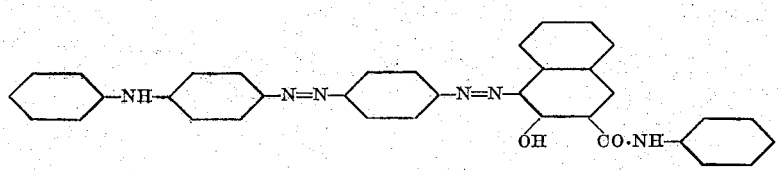

(6) For the 4.5-grams of 2.3 hydroxynaphthoic acid-5'-chloro-1'-methyl-2'-anilide used for the grounding in Example 3, there is substituted the corresponding quantity of (a) 2.3-hydroxynaphthoic acid-5'-chloro-1'-methyoxy-2'-anilide (b) 2.3-hydroxynaphthoic acid-4'-chloro-1'-methoxy-2'-anilide (c) 2.3-hydroxynaphthoic acid-2'-5'-dimethoxy-1'-anilide (d) 2.3-hydroxynaphthoic acid-4'-chloro-1'-methyl-2'-anilide (e) 2.3-hydroxynaphthoic acid-1'-naphthylamide.

There are obtained garnet dyeings which become black when after-treated at the boil.

(7) By substituting for the 7.5 grams of 2.3-hydroxynaphthoic acid anilide used in Example 5 the corresponding quantity of 2.3-hydroxynaphthoic acid-1'-methyl-2'-anilide or 2.3-hydroxynaphthoic acid-1'-methoxy-2'-anilide, there are likewise obtained garnet dyeings which turn black when after-treated in a boiling bath in the manner disclosed in the foregoing examples.

Since an object of the present invention is to provide dyestuffs of good fastness properties, which dyestuffs are insoluble in water and alkalies, it is to be understood that the aromatic nuclei of the general formulæ appearing in the appended claims contain no substituents which are known to render organic compounds soluble in water or alkalies and which tend to depreciate the fastness of the dyestuffs to alkalies. Substituents of this kind are, for instance, the sulfonic acid and the carboxylic acid group.

We claim:

1. As new products the water-insoluble azo-dyestuffs of the following probable formula:

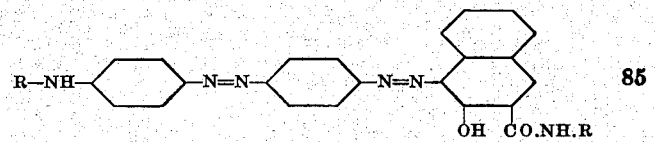

wherein the R's represent residues of the benzene or naphthalene series, said products being dark powders and yielding, when produced on the fiber, black dyeings.

2. As new products the water-insoluble azo-dyestuffs of the following probable formula:

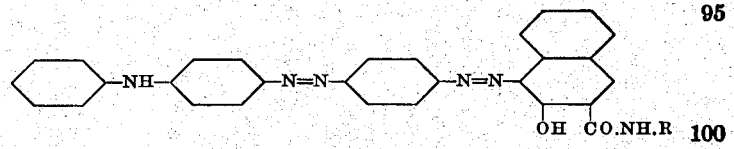

wherein the R's represent residues of the benzene or naphthalene series, said products being dark powders and yielding, when produced on the fiber, black dyeings.

3. As new products the water-insoluble azo-dyestuffs of the following probable formula:

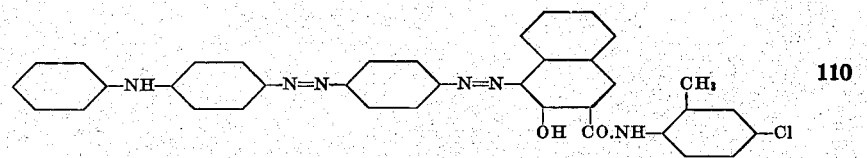

wherein R represents a residue of the benzene series, said products being dark powders and yielding, when produced on the fiber, black dyeings.

4. As a new product the water-insoluble azo-dyestuff of the following probable formula:

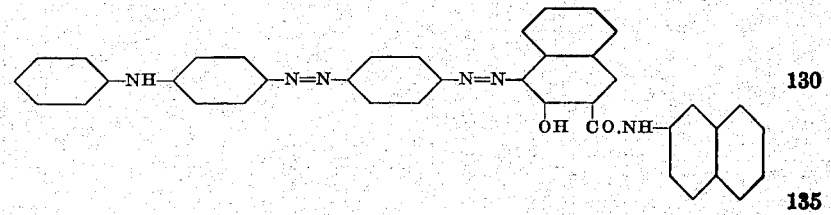

said product being a dark powder and yielding, when produced on the fiber, a black dyeing.

5. Fiber dyed with a dyestuff as claimed in claim 1.

6. Fiber dyed with a dyestuff as claimed in claim 2.

7. Fiber dyed with a dyestuff as claimed in claim 3.

8. Fiber dyed with a dyestuff as claimed in claim 4.

9. As a new product, the water-insoluble azo-dyestuff of the following probable formula:

said product being a dark powder and yielding, when produced on the fiber, a black dyeing.

10. Fiber dyed with a dyestuff as claimed in claim 9.

ERWIN HOFFA.
PAUL JÖRG.